(12) United States Patent
Grimm

(10) Patent No.: US 12,140,235 B2
(45) Date of Patent: Nov. 12, 2024

(54) VALVE BLOCK FOR SINGLE USE IN A BIO PROCESS

(71) Applicant: Sartorius Stedim Biotech GmbH, Goettingen (DE)

(72) Inventor: Christian Grimm, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 10 days.

(21) Appl. No.: 18/020,271

(22) PCT Filed: Aug. 18, 2021

(86) PCT No.: PCT/EP2021/072950
§ 371 (c)(1),
(2) Date: Feb. 8, 2023

(87) PCT Pub. No.: WO2022/038189
PCT Pub. Date: Feb. 24, 2022

(65) Prior Publication Data
US 2023/0272865 A1    Aug. 31, 2023

(30) Foreign Application Priority Data
Aug. 18, 2020   (DE) ...................... 20 2020 104 788.4

(51) Int. Cl.
*F16K 11/22*   (2006.01)
*F16K 27/00*   (2006.01)

(52) U.S. Cl.
CPC ............ *F16K 11/22* (2013.01); *F16K 27/003* (2013.01); *Y10T 137/87684* (2015.04); *Y10T 137/87877* (2015.04)

(58) Field of Classification Search
CPC . F16K 1/38; F16K 1/385; F16K 11/22; F16K 7/00; F16K 7/12; F16K 7/14;
(Continued)

(56) References Cited

U.S. PATENT DOCUMENTS 3,019,815 A  *  2/1962  Lenardon .................. F16K 7/16
                                                     137/883
4,176,686 A  *  12/1979  Stahle ....................... F16K 1/34
                                                     137/892
(Continued)

FOREIGN PATENT DOCUMENTS

DE    202012004384 U1    5/2012
JP    2010203533 A       9/2010
WO    2020126639 A1      6/2020

*Primary Examiner* — Robert K Arundale
(74) *Attorney, Agent, or Firm* — Dilworth IP, LLC

(57) ABSTRACT

A valve block for single use in a bioprocess, having a plurality of valve units and a one-piece block body having a main conduit. Each valve unit includes a secondary conduit, a valve seat between the secondary conduit and the main conduit, a closure part having a gripping portion, and an actuator coupled to the gripping portion which can transfer the closure part from a first switching position, in which the closure part is pressed against the valve seat and blocks a fluid communication between the secondary conduit and the main conduit, to a second switching position, in which the closure part is lifted from the valve seat and unblocks the fluid communication between the secondary conduit and the main conduit. The gripping portion is sealed against both the main conduit and the secondary conduit in both switching positions of the valve unit.

13 Claims, 1 Drawing Sheet

(58) Field of Classification Search
CPC ........... F16K 27/003; Y10T 137/87716; Y10T 137/87877; Y10T 137/87885
USPC ........................................................ 251/331
See application file for complete search history.

(56) References Cited

U.S. PATENT DOCUMENTS

| | | | | |
|---|---|---|---|---|
| 5,139,225 | A * | 8/1992 | Olson | F16K 27/003 251/335.2 |
| 5,967,188 | A * | 10/1999 | Chien-Chuan | F16K 31/0655 137/861 |
| 6,089,538 | A | 7/2000 | Shirkhan | |
| 8,667,989 | B1 * | 3/2014 | Feldmeier | F16K 31/122 251/63.5 |
| 2003/0155024 | A1 * | 8/2003 | Hanada | F16K 27/003 137/861 |
| 2007/0137707 | A1 * | 6/2007 | Matsuzawa | F16K 11/22 137/240 |
| 2007/0289646 | A1 * | 12/2007 | Ravedati | E03C 1/021 137/606 |
| 2014/0109973 | A1 * | 4/2014 | Neumeister | C23C 16/4412 137/1 |

* cited by examiner

VALVE BLOCK FOR SINGLE USE IN A BIO PROCESS

FIELD OF THE INVENTION

The invention relates to a valve block for single use in a bioprocess.

BACKGROUND

Trends in recent years in the biopharmaceutical industry increasingly point in the direction of the use of disposable or single-use components, in particular due to the high flexibility that can be achieved therewith and the savings in time, investment and operating expenditure such as cleaning and validation and checking thereof. Single-use components are now not only used in the area of product and process development, but meanwhile also in the area of clinical trial manufacturing (CTM) for the approval procedure and even in commercial good manufacturing practice (GMP) in the production of pharmaceuticals.

Single-use components are clearly distinguished in professional circles from conventional re-usable or multi-use components, e.g. stainless steel cylinders, which are not simply disposed of after a single use, but have to be cleaned, sterilized and tested again for each subsequent use. Single-use systems are desired not only for small-volume processes but also for larger scale, and the cost of such systems should not increase to unrealistically high levels.

An example of a process step relevant in the biopharmaceutical industry is chromatographic purification. Different types of chromatography methods are employed here, such as affinity chromatography (e.g. with protein) or ion-exchange chromatography (IEX), in particular cation-exchange chromatography (CEX) or anion-exchange chromatography (AEX), which can be implemented both with classical separating columns and membrane adsorbers. Depending on the type, the process can be run in bind-and-elute or flow-through mode.

In addition to the process pressure and media flow, the composition and properties of the various buffers and flushing solutions are important parameters for controlling these process steps. To monitor the addition and processing of the various buffers, it must be possible to regulate or adjust the addition, sequence and flow rates of the individual buffers and flushing solutions. In the vast majority of cases, this is achieved by means of a pump in combination with a number of regulating or pinch valves. When disposable components are used, this can be effected either by means of so-called peristaltic or hose pinch valves or by means of diaphragm-type regulating valves. Here, arrangements made up of several peristaltic valves or diaphragm-type regulating valves have a number of drawbacks, some of which are briefly discussed below:

A large footprint, i.e. the hose assemblies are very large and unwieldy and take up a lot of space on the respective device or process system.

A large dead space in the hoses and possibly in other components, i.e. after completion of the process step there is still a relatively large amount of medium contained in the hose system which is flushed out unutilized. This is uneconomical, since the medium often has a high financial value (e.g. antibody material). Due to the large dead space, unwanted dilution and mixing effects also occur during process control, possibly causing a broadening of the chromatogram peaks and, as a result, a more inefficient separation.

A large number of hose-valve connections, resulting in an increased risk of leaks and leakage as well as a relatively complex type of assembly with associated increased production cost.

Possibly giving negative properties to the target molecule of the process, i.e. it could be damaged due to the unfavorable geometry of the components in terms of fluid dynamics and the undesirable pressure drops involved.

SUMMARY

The object of the invention is to avoid or compensate for the above-mentioned drawbacks and to provide a cost-effective, compact and easy-to-handle alternative for single-use applications.

This object is achieved by a valve block having the features of claim 1. Advantageous and expedient configurations of the valve block according to the invention are indicated in the dependent claims.

The valve block according to the invention is intended for single use in a bioprocess and includes a plurality of valve units. The valve block includes a one-piece block body having a main conduit formed therein. Further, the valve block includes, for each valve unit, at least one secondary conduit formed in the block body, a valve seat formed in the block body between the secondary conduit and the main conduit, and a closure part having a gripping portion. In addition, the valve block includes, for each valve unit, an actuator which is coupled to the gripping portion of the closure part and can transfer the closure part from a first switching position of the valve unit, in which the closure part is pressed against the valve seat and blocks a fluid communication between the secondary conduit and the main conduit, to a second switching position of the valve unit, in which the closure part is lifted from the valve seat and unblocks the fluid communication between the secondary conduit and the main conduit. The gripping portion of the closure part is arranged such that it is sealed against both the main conduit and the secondary conduit in both switching positions of the valve unit.

The invention is based on the finding that the large number of hose connections and the attendant void volume of known addition arrangements, which are intended for single use in a bioprocess, can be avoided by forming several single-use valve units jointly in one valve block. The valve block according to the invention permits an extremely compact and space-saving arrangement of the valve units involving a minimum of void volume. Owing to the conduits formed directly within the block body of the valve block, fewer hoses and fewer hose connections are required, which considerably facilitates handling and, moreover, minimizes the risk of faulty assembly.

A further significant advantage of the valve block according to the invention consists in that the actuators are completely separate from the medium flowing through the conduits of the valve block. This is made possible by the fact that the gripping portion of the closure part, to which the actuator is coupled, is disposed in an area that is sealed off from the conduits in both switching positions of the valve unit. Owing to this separation, it is not absolutely necessary to sterilize the actuators since they do not come into contact with the medium and therefore cannot contaminate the medium.

In this context, it is advantageous to provide a stable but detachable mounting of the actuators on the block body, i.e. a mounting that can be separated easily and without damage or even destruction, so that the actuators need not be disposed of together with the remaining components of the valve block after the single use of the valve block, but can be reused. Preferably, the actuators are mounted on the block body with the aid of valve caps, which can perform other functions as well, in particular sealing the block body after assembly of the components, arranged therein, of the valve units.

In order that the actuators can be removed from the block body without difficulty, the coupling of the actuators to the gripping portions of the closure part should also be releasable.

The configuration of the valve block according to the invention allows an extension of the range of applications and an increase in safety during operation, in particular with regard to applications involving high pressures. Applications involving pressures of 4 bar and higher are envisaged when using the valve block according to the invention. While this is hardly possible when using conventional, non-reinforced hose lines, it is possible with a block body that is made from a robust, hard plastic and in which the conduits can withstand such pressures.

Preferably, the valve seat of each valve unit is at least partly substantially funnel-shaped, and the closure part includes a jacket portion which is adapted to the funnel shape of the valve seat. A substantially conical jacket portion is particularly suitable therefor. The funnel shape of the valve seat has turned out to be advantageous in terms of fluid mechanics and with a view to the forces required for closing the valve seat, in particular in the case of a secondary conduit arranged transversely to and at the same time offset in height from the main conduit. Owing to the lower amount of force required for closing the valve as compared to other approaches, it is possible to use smaller-dimensioned electric motor, pneumatic or solenoid drives for the actuators.

According to a special embodiment of the invention, an edge area of the closure part is fixed in place on the block body, and at least the jacket portion of the closure part is formed from an elastically deformable material. In this embodiment, moreover, the gripping portion of the closure part is coupled to the jacket portion. The closure part is fixed in a predefined position by clamping; nevertheless, the elastically deformable jacket portion can be raised and lowered from the valve seat by the actuator via the gripping portion in order to unblock or block the fluid communication between the secondary conduit and the main conduit. The advantage here is that the closure part can be clamped with precision and the movement or deformation of the closure part to change the switching position takes place exclusively inside the block body.

For fixing the closure part in place, the edge area of the closure part may be clamped between a valve cap and a shoulder of the block body. The fastening required for this of the valve cap to the block body may again be achieved by welding, gluing, a snap-in connection or some other suitable technique.

In a preferred embodiment of the invention, the jacket portion of the closure part continues into a bottom which faces the main conduit or the secondary conduit. From the bottom, the gripping portion extends into a cavity of the closure part surrounded by the jacket portion. Such a geometry allows easy and effective unblocking and blocking of the valve seat, in each case without requiring much force.

For lifting and lowering the closure part, the actuator preferably includes a displaceable gripper which is coupled to the gripping portion of the closure part.

A special further development of the invention provides that the jacket portion of the closure part has an expandable and compressible structure. The expandable and compressible structure may be similar to that of a bellows or a concertina having folds, or it may be meander-shaped or have a comparable shape. Such a structure allows or assists the elastic deformation of the jacket portion of the clamped closure part required for the lifting and lowering of the jacket portion.

The function of the valve units is not limited to blocking and unblocking a fluid communication between a secondary conduit and the main conduit. At least in one of the valve units, provision may be made that the closure part can block or unblock a secondary conduit independently of the main conduit and/or can unblock or block one or more branchings of a secondary conduit.

With a view to efficient manufacture and assembly, it is advantageous that at least some of the closure parts of the valve units are formed integrally with each other. The same applies to the valve caps of the valve units.

The manufacture and assembly of the valve block may furthermore be simplified in that connecting pieces are formed integrally with the block body at the ends of the main conduit as well as of the secondary conduits leading out of the block body.

The structure, according to the invention, of the valve block allows all of the components of the valve block, with the exception of the actuators, to be pre-sterilized and, if required, pre-assembled.

The actuators of the valve block can be controlled flexibly. In particular, the actuators are designed such that they can be controlled by a control unit either individually, in groups or all jointly as desired. In this way, it is possible to actuate the valve units of the valve block individually, in groups or all at the same time.

Transferring the closure part of the valve unit from the first to the second switching position and vice versa can also be effected quasi-continuously if a suitable actuator drive is used, in order to allow a certain flow control by the fluid communication between the main conduit and the secondary conduit.

BRIEF DESCRIPTION OF THE DRAWINGS

Further features and advantages of the invention will be apparent from the description below and from the accompanying drawings, to which reference is made and in which.

DETAILED DESCRIPTION

Figure 1:
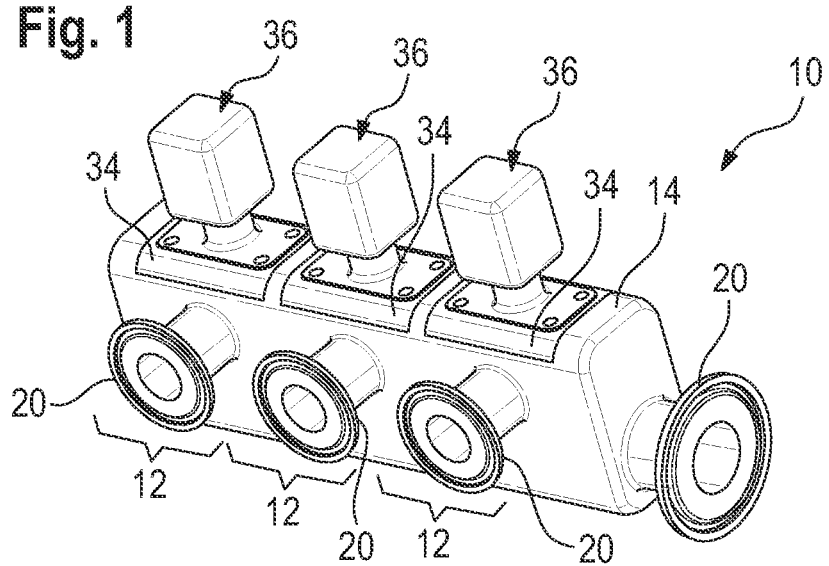
FIG. 1 shows a perspective view of a valve block according to the invention.
Figure 2:
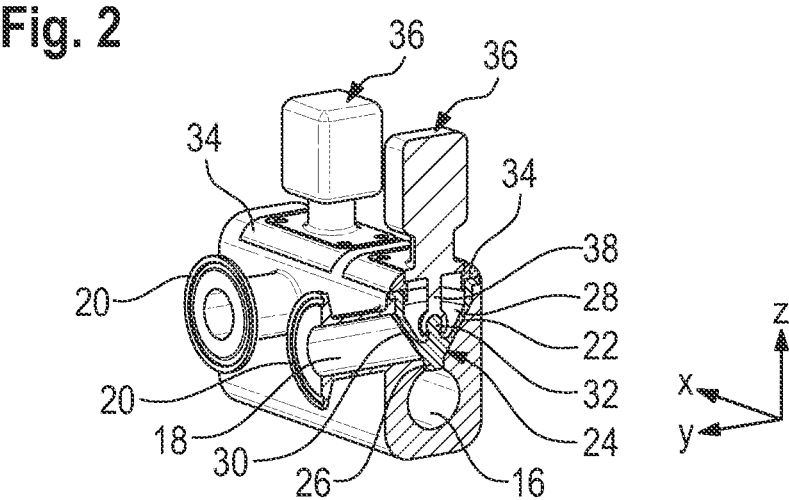
FIG. 2 shows a cross-sectional view of the valve block of FIG. 1.
Figure 3:
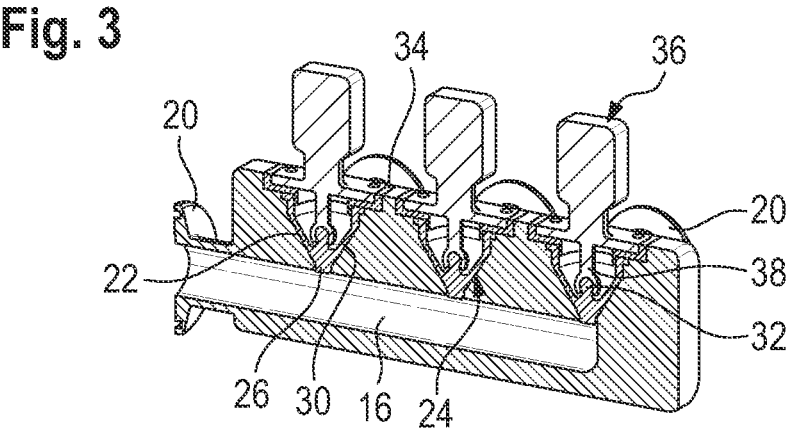
FIG. 3 shows a longitudinal sectional view of the valve block of FIG. 1.

FIGS. 1 to 3 show a valve block 10 for use in a bioprocess. In the illustrated embodiment, three valve units 12 are combined in the valve block 10, but there may also be fewer or more (e.g., twelve). The basic structure of the valve block 10 will be discussed in more detail below, irrespective of the number of valve units 12.

In an elongated, here essentially cuboid block body 14 of the valve block 10, a main conduit 16 extending in the longitudinal direction x thereof and a plurality of secondary conduits 18, each associated with a valve unit 12, are formed which extend transversely to the main conduit 16 in the y-direction and above the main conduit 16 with respect to the z-direction. The secondary conduits 18 may each extend from the respective valve unit 12 to only one longitudinal side (as illustrated here) or to two or even three longitudinal sides of the block body 14. In general, the courses and the number of the branchings of the secondary conduits 18 can be formed in the block body 14 largely as desired in accordance with the requirements of the respective application. Basically, it is also possible to provide a branched main conduit 16 or a plurality of main conduits 16 in the block body 14.

The ends of the main conduit 16 and of the secondary conduits 18 leading out of the block body 14 have connecting pieces 20 provided thereon, to which hose lines can be connected. The connecting pieces 20 may be hose barbs or subcomponents for producing a tri-clamp or Luer-lock connection or some other suitable type of connection. Typical sizes for the inner diameter of the connecting pieces 20 as well as of the main conduit 16 and secondary conduits 18 are ⅛" (3.18 mm), ¼" (6.35 mm), ⅜" (9.53 mm), ½" (1.27 cm), ¾" (1.91 cm) and 1" (2.54 cm). Connecting pieces 20 that are not needed may be sealed by dummy plugs.

The block body 14, preferably together with the connecting pieces 20, is formed in one piece from a resistant, hard plastic material. This means that the block body 14 is preferably, but not necessarily, made of a single and unitary part. If the block body 14 is not produced from a single and unitary part, however, its sections are not only firmly but so intimately connected to one another that they do not appear to be a plurality of components joined together and can at least no longer be detached from one another without being destroyed. Further components can be welded or glued to the block body 14. Suitable materials for the block body 14 include, e.g., polyolefins, such as polyethylene (PE) and polypropylene (PP), or polyesters, such as polyethylene terephthalate (PET), polybutylene terephthalate (PBT) or polycarbonates (PC).

The secondary conduits 18 are each in fluid communication with the main conduit 16; these fluid communications can be unblocked by means of the valve units 12 individually, in groups or collectively, as will be explained further below.

In the area of the fluid communication between the associated secondary conduit 18 and the main conduit 16, each valve unit 12 has a valve seat 22 formed by a material recess in the block body 14. In the embodiment shown, the valve seats 22 are substantially funnel-shaped.

Seated on each of the valve seats 22 is a respective closure part 24, which is formed from an elastically deformable material, such as rubber, silicone, thermoplastic elastomer (TPE), thermoplastic polyurethane (TPU) or a similar material. The closure part 24 may, in particular, be manufactured by means of an injection molding process or an additive manufacturing process (e.g., 3D printing).

The outer contour of the closure part 24 is adapted to the funnel shape of the valve seat 22 such that it can seal the fluid communication between the secondary conduit 18 and the main conduit 16. Depending on the design and arrangement of the secondary conduits 18, a closure part 24 of a valve unit 12 may also be used to close off only a secondary conduit 18 (that is, without affecting the main conduit 16), for instance if the secondary conduit 18 extends between opposite sides of the block body 14. If the secondary conduit 18 has branch-offs, the closure part 24 may also be used to block only one or several of these branch-offs. In principle, combinations of the options described above are also feasible, e.g. blocking the fluid communication between the main conduit 16 and one or more branch-offs of a secondary conduit 18. For the sake of simplicity, however, with regard to the function of the valve units 12, only the variant shown in particular in FIGS. 2 and 3 will be discussed below, in which the closure part 24 can open or close the fluid communication between an associated secondary conduit 18 and the main conduit 16.

The closure part 24 is hollow on the inside and has a bottom 26 facing the main conduit 16. The bottom 26 is adjoined by a substantially cone-shaped jacket portion 30, which is circumferential with respect to the z-direction and laterally surrounds the cavity 28 of the closure part 24 and is adjacent to the inner end of the secondary conduit 18. The cavity 28 is open in the z-direction.

The jacket portion 30 of the closure part 24 has an expandable and compressible structure—not shown in detail in the figures—in the form of a bellows, concertina, meander or similar, the significance of which will be explained in more detail below.

The closure part 24 further includes a gripping portion 32 which extends from the bottom 26 of the closure part 24 into the cavity 28. The gripping portion 32 is convex in shape here, although this is not necessarily required. It should be noted that the gripping portion 32 is located in a region of the valve block 10 that is permanently sealed from both the main conduit 16 and the secondary conduit 18.

The closure parts 24 of the individual valve units 12 may also be connected with each other, e.g. at the upper edge of the jacket portions 30. This simplifies manufacturing, since several or all closure parts 24 together can be manufactured and assembled as a unit.

The closure parts 24 are held in position in the block body 14 by valve caps 34. The valve caps 34 are fastened to the block body 14 on the upper side thereof—with respect to the z-direction—and each clamp a laterally outwardly projecting edge area of the jacket portions 30 of the closure parts 24 to a shoulder of the block body 14. The valve caps 34 themselves are fastened by welding, gluing, clamping, a snap-in connection or other suitable connection technique.

It is basically possible to form the valve caps 34 integrally with one another, i.e. the valve caps 34 are connected to one another and can be manufactured together as a unit.

The valve caps 34 also each provide a stable mounting for an actuator 36 (drive unit) for actuating the respective valve unit 12. The mounting is detachable, i.e. the actuators 36 can be disassembled from the valve block 10 after use thereof.

The type of drive of the actuator 36 (electric, pneumatic, hydraulic, etc.) is not of importance here, but rather the mechanical actuation of the respective valve unit 12, as explained below, carried out by means of the actuator 36.

The actuator 36 includes a gripper 38 that is movable linearly in the z-direction. The gripper 38 extends through the valve cap 34 into the cavity 28 and engages around the gripping portion 32, although other types of coupling are also possible. In any case, the coupling is releasable so that the entire actuator 36, including the gripper 38, can be removed from the valve cap 34 and the block body 14.

For each valve unit 12, at least two switching positions can be realized by means of the associated actuator 36. The first switching position is shown in FIGS. 2 and 3. The gripper 38 presses the closure part 24 against the valve seat 22, so that the fluid communication between the main conduit 16 and the secondary conduit 18 of the valve unit 12 is blocked.

In the second switching position, the gripper 38 pulls the gripping portion 32 with the bottom 26 of the closure part 24 upward in the z-direction. Since the upper edge area of the jacket portion 30 is supported by the valve cap 34, the jacket portion 30 deforms elastically. This is made possible or at least furthered by the expandable and compressible structure of the jacket portion 30 as discussed above. In the second switching position, the lower portion of the closure part 24 is lifted in the z-direction to such an extent that a fluid communication is established between the main conduit 16 and the secondary conduit 18 of the valve unit 12. This fluid communication is sufficient to bring about a desired flow from the main conduit 16 into the secondary conduit 18 or vice versa (depending on the application).

In principle, it is also possible to provide further intermediate positions by appropriate control of the actuator 36 in order to adjust the flow rate to a desired degree. A quasi-continuous adjustment of the flow rate as required is preferred.

All components of the valve block 10, with the exception of the actuators 36, are designed as dedicated disposable components and may be pre-assembled and sterilized before use—or even as early as prior to delivery—in particular by gamma radiation. In this case, the materials of the individual valve block components are selected such that their mechanical properties with respect to their function are not significantly impaired by the irradiation. Before putting the valve block 10 into operation, it is then only necessary to mount the actuators 36 and to couple their grippers 38 to the gripping portions 32 of the closure parts and to produce the hose connections. Since neither the grippers 38 nor other parts of the actuators 36 come into contact with the medium flowing through the main conduit 16 and the secondary conduits 18, regardless of the switching positions of the valve units 12, the actuators 36 need not necessarily be sterilized.

In operation, the valve units 12 of the valve block 10 can be controlled by means of the actuators 36 individually, in groups, or all jointly, in order to release the supply of buffer, flushing medium, etc. through the secondary conduits 18 into the main conduit 16 in a bioprocess, or to distribute a medium from the main conduit 16 to the secondary conduits 18. Of course, the valve block 10 is not limited to these applications.

After the single use of the valve block 10 in the bioprocess, the actuators 36 are removed and the other components of the valve block 10 can be disposed of as a unit, if necessary also together with the connected hose lines.

LIST OF REFERENCE NUMBERS 10 valve block
12 valve unit
14 block body
16 main conduit
18 secondary conduit
20 connecting piece
22 valve seat
24 closure part
26 bottom
28 cavity
30 jacket portion
32 gripping portion
34 valve cap
36 actuator
38 gripper

The invention claimed is:

1. A valve block for single use in a bioprocess, comprising a plurality of valve units, the valve block comprising a one-piece block body having a main conduit formed therein and, for each valve unit
   at least one secondary conduit formed in the block body;
   a valve seat formed in the block body between the secondary conduit and the main conduit;
   a closure part formed in one piece from an elastically deformable material and having a gripping portion;
   an actuator which is coupled to the gripping portion of the closure part and can transfer the closure part from a first switching position of the valve unit, in which the closure part is pressed against the valve seat and blocks a fluid communication between the secondary conduit and the main conduit, to a second switching position of the valve unit, in which the closure part is lifted from the valve seat and unblocks the fluid communication between the secondary conduit and the main conduit,
   wherein the gripping portion of the closure part is arranged such that it is sealed off from both the main conduit and the secondary conduit in both switching positions of the valve unit,
   the valve seat being funnel-shaped and the closure part including a conical jacket portion which is adapted to the funnel shape of the valve seat,
   an edge area of the closure part being fixed in place on the block body, the gripping portion of the closure part being coupled to the jacket portion, and
   the jacket portion of the closure part continuing into a bottom, which faces the main conduit or the secondary conduit, and from which the gripping portion extends into a cavity of the closure part surrounded by the jacket portion.

2. The valve block according to claim 1, characterized in that the actuator is stably but releasably mounted on the block body by means of a valve cap.

3. The valve block according to claim 2, characterized in that the coupling of the actuator to the gripping portion of the closure part is releasable.

4. The valve block according to claim 1, characterized in that the block body is formed from a rigid plastic material.

5. The valve block according to claim 1, characterized in that for fixing the closure part in place, the edge area of the closure part is clamped between a valve cap and a shoulder of the block body.

6. The valve block according to claim 1, characterized in that the actuator includes a displaceable gripper which is coupled to the gripping portion of the closure part.

7. The valve block according to claim 1, characterized in that the jacket portion of the closure part has an expandable and compressible structure.

8. The valve block according to claim 1, characterized in that at least in one of the valve units, the closure part can block or unblock the secondary conduit independently of the main conduit, such that the closure part controls fluid flow through the secondary conduit without controlling fluid flow through the main conduit.

9. The valve block according to claim 1, characterized in that connecting pieces are formed integrally with the block body at ends of the main conduit as well as of the secondary conduits leading out of the block body.

10. The valve block according to claim 1, characterized in that all components of the valve block, with exception of the actuators, are pre-sterilized and pre-assembled.

11. The valve block according to claim 1, characterized in that the actuators are designed to be controlled individually, in groups or all jointly.

12. The valve block according to claim 1, characterized in that transferring the closure part from the first to the second switching position and vice versa is effected quasi-continuously.

13. The valve block according to claim 1, wherein all components of the valve block, with exception of the actuators, are disposable components.

* * * * *